Sept. 3, 1968     A. H. AGETT ETAL     3,399,885
GLASS SHEET FEEDER FOR CUTTING AND PROCESSING MACHINES
Filed Feb. 3, 1966     2 Sheets-Sheet 2
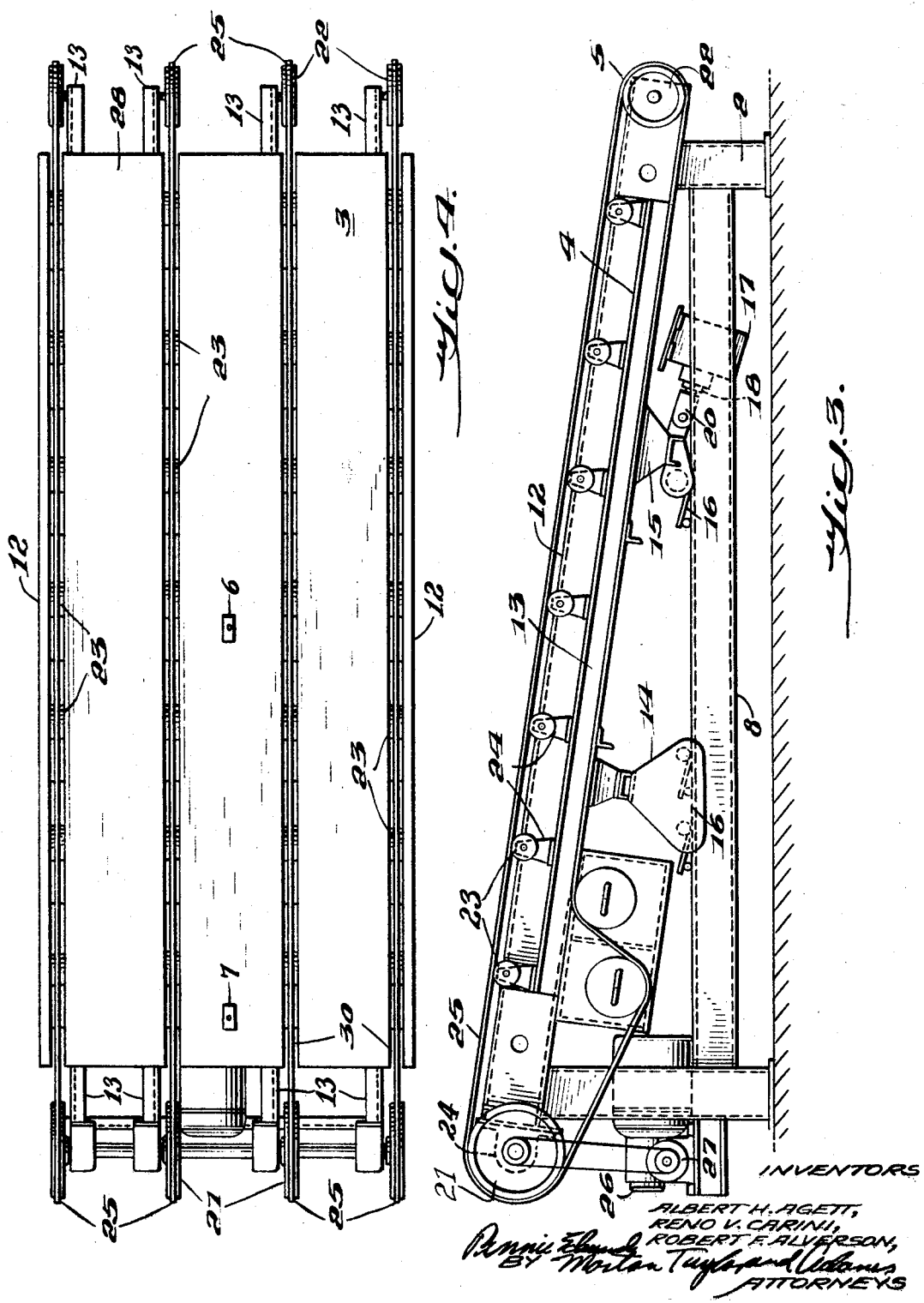

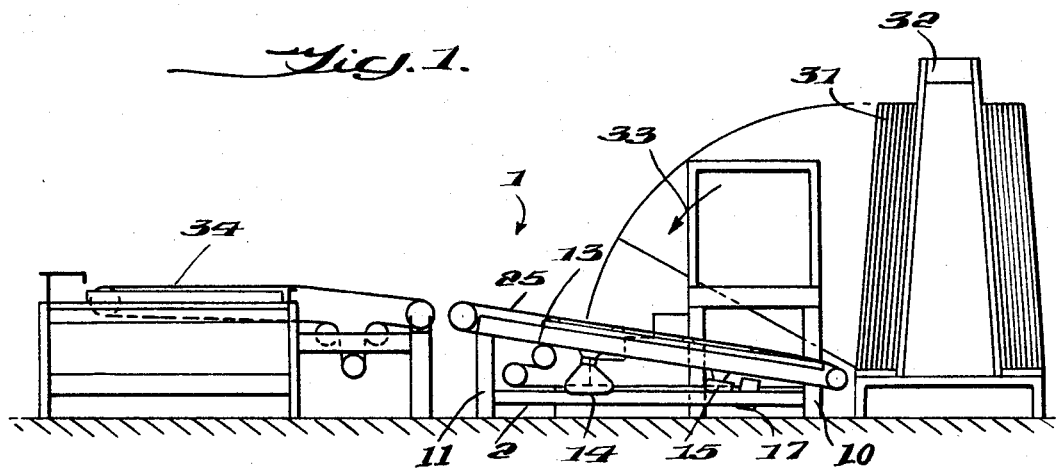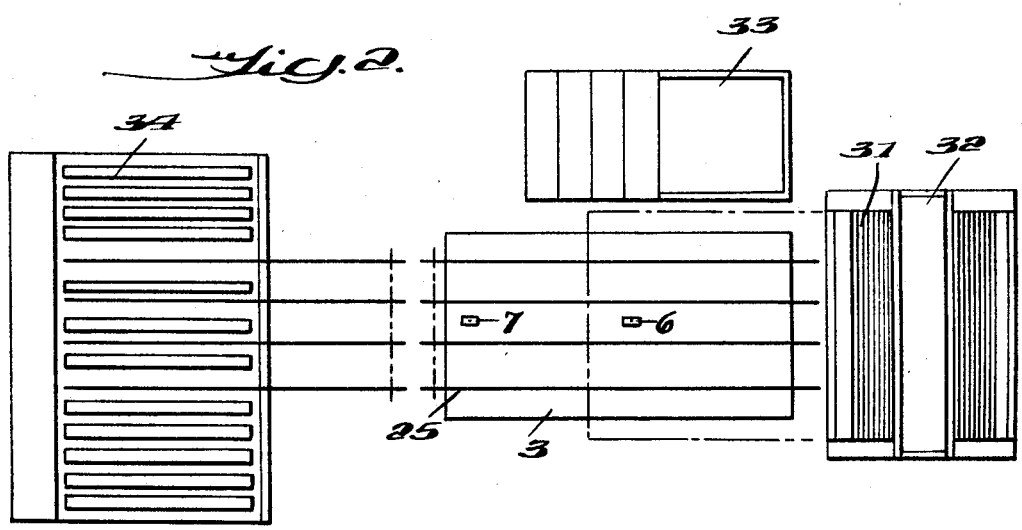

United States Patent Office 3,399,885
Patented Sept. 3, 1968

3,399,885
GLASS SHEET FEEDER FOR CUTTING AND
PROCESSING MACHINES
Albert H. Agett, Kingsport, Tenn., and Reno V. Carini, Jeannette, and Robert F. Alverson, Pittsburgh, Pa., assignors to American Saint-Gobain Corporation, a corporation of Delaware
Filed Feb. 3, 1966, Ser. No. 524,810
4 Claims. (Cl. 271—1)

ABSTRACT OF THE DISCLOSURE

A sheet handling and feeding device including a supply rack for holding a plurality of sheets in vertical position, a sheet receiving table positioned adjacent to the supply rack for receiving individual sheets from the supply rack as they are pivoted from the vertical plane and allowed to fall by gravity onto the table, and sheet conveying mechanism for conveying the sheets received on the table away from the supply rack.

---

This invention relates to sheet feeding devices and more particularly to a sheet feeder for feeding glass sheets to cutting and processing machines.

In order that a glass production line operates economically, it is necessary that multi-size glass sheets be fed to a flat glass cutting machine or a processing machine at a rapid rate. Efficient operation of these machines requires a feed cycle in the order of three to six seconds per sheet.

Many different prior art sheet feeding devices have been devised for automatic and semi-automatic feeding of sheet material. However, all have been expensive to construct and difficult to operate and maintain. One such prior art device that is extensively used in glass production lines secures a hold on a glass sheet, stacked on a suitable support, by conventional suction attaching devices. The glass sheet is then lifted from the pack of glass sheets and placed on a transfer device which delivers it to subsequent sheet cutting or processing machines. Such devices do not maintain a cycle time that is required for high speed cutting or processing of these sheets, and the glass sheet often is not securely held and breaks during the feeding process.

When large sheets of plate glass are stacked together, the removal of one sheet from the stack is difficult because of suction between the individual sheets which makes the removal of single sheets difficult and may place several sheets on the cutting line, which causes jamming and malfunctioning of the cutting and processing machines.

The present invention overcomes the prior art disadvantages by providing a sheet feeder which fulfills the requirements for feeding single glass sheets at a very rapid rate without breakage, and which eliminates multiple sheet feeding. The sheet feeder of this invention is also economical to operate and can be constructed at a very low cost.

One feature of the present invention resides in a receiving table which is adapted to receive a glass sheet manually removed from an A frame storage rack. Another feature of the invention is a conveyor belt system so constructed as to remove the glass sheet from the receiving table.

A still further feature of this present invention is the provision of a carriage assembly which lifts the conveyor belt system to engage the glass sheets on the receiving table and to remove it therefrom.

Still another feature of the invention lies in a limit switch system which operates the carriage assembly and conveyor belt system only when a sheet of glass is placed on the receiving table and keeps it operating until the glass sheet is completely removed from the receiving table.

A more complete appreciation of the invention and the attendant advantages thereof will be readily appreciated as the same becomes better understood by reference to the following detailed description when considered in connection with the accompanying drawings, wherein:

FIG. 1 is a side elevation of the apparatus of the invention;
FIG. 2 is a plan view of FIG. 1;
FIG. 3 is a detailed view of FIG. 1; and
FIG. 4 is a detailed view of FIG. 2.

The improved glass sheet feeder 1 includes a frame 2, a receiving table 3, a carriage assembly 4, a conveyor belt system 5 and two limit switches 6 and 7 which actuate the conveyor belt system 5 and the carriage assembly 4.

The steel frame 2 comprises lower supporting bars 8, legs 10 and 11 and upper supporting bars 12. One leg 10 is shown longer than the other leg 11 which facilitates the feeding of a glass sheet to a higher position as hereinafter described.

Mounted on the upper supporting bars 12 are the carriage assemblies 4 which are adapted to be raised or lowered from an operating to a nonoperating position. The carriage assemblies 4 shown in their lowered position comprise idler trays 13 and cam followers 14 and 15. Incline cams 16 are mounted on the lower supporting bars 8 and form inclined riding surfaces for the cam followers 14 and 15. A single-acting air cylinder 17 is also mounted on the lower supporting bars 8.

The cam follower 15 is attached to the air cylinder piston 18 through a clevis connection 20. When the air cylinder 17 is actuated through a conventional air valve, not shown, the air cylinder piston 18 forces the cam follower 15 horizontally over its respective incline cam 16. This horizontal force also acts to force the cam follower 14 over its respective incline cams 16. The movement of the cam followers 14 and 15 raises the entire carriage assembly 4.

The air cylinder-incline cam combination, shown above, is the preferable means of raising the carriage assembly 4. However, it will be appreciated that any mechanism that will raise the carriage assembly 4 may be used, such as a motor driven rotating cam or magnetically attracted mechanism.

Four belt and pulley combinations comprise the conveyor belt system 5 for feeding glass sheets. Two large pulleys 21 and 22 and a number of smaller pulleys 23 are mounted on each of the movable idler trays 13 by means of idler brackets 24. A conveyor belt 25 is provided over each set of pulleys. The conveyor belts 25 are driven by a gear motor 26 through a sprocket drive 27 or any other conventional drive means.

The wooden receiving table 3 is formed of a number of flat, rectangular wooden sections 28 secured together with suitable cross struts attached to their underside, forming slots or channels 30 adapted to receive the conveyor belts 25. The top portion of the wooden receiving table 3 may be covered with a layer of felt to aid in the prevention of scratching of any glass surface.

Two limit switches 6 and 7 are mounted flush with the top of the wooden table 3 with the contacts thereof extending thereabove. When an object is laid on the table, the switches 6 and 7 are in turn depressed and complete a circuit through the conveyor gear motor 26 and air cylinder operating means. One limit switch 6 is centrally located on the wooden table 3, while the second limit switch 7 is placed near the end of the table 3. Both limit switches 6 and 7 are connected in parallel and actuation of either limit switch 6 or 7 will complete a circuit and energize the conveyor gear motor 26 and air cylinder operating means.

The operation of the sheet feeder 1 may be described as follows. A pack of sheets of glass 31 to be fed by the sheet feeder 1 to a cutting and processing machine, is placed on an A frame storage rack 32 which is, in turn, placed adjacent the sheet feeder 1. A man standing on a loader's platform 33 separates one sheet of glass from the pack 31 and pushes the top of the sheet away from the pack 31. The sheet falls in an arcuate path and lands on the wooden table 3. The fall of the sheet of glass is cushioned because of the compressive air pressure developed between the glass and the table top 3.

Alternately, instead of utilizing a man to initiate the feed cycle, a sheet separator may be used that would automatically push the sheet from its vertical position on the A frame storage rack 32 to the horizontal position on the receiving table 3 so that complete automatic feeding could be accomplished by the device.

The receiving table 3 is shown mounted in an angular position because it is desired to lift the glass sheets to a level above the storage rack 32. However, the sheet feeder 1 operates equally as well if the receiving table 3 is parallel to the ground or even inclined away from the storage rack 32.

Before the glass falls on the wooden table 3, the carriage assembly 4 is in the lowered position. The conveyor belts 25, mounted on the carriage assembly 4, are also in their lowered position in the slots 30 on the wooden table 3. As a glass sheet lands on the wooden table 3, the glass contacts and trips the limit switch 6, closing a circuit and sending a signal to a conventional air valve (not shown) which allows air to pass through the air cylinder 17 and energizes the conveyor belt gear motor 26 circuit. As hereinabove described, the air cylinder 17 operates to raise the carriage assembly 4 over the incline cams 16 which raises the conveyor belts 25 mounted thereon above the wooden receiving table 3. The conveyor belts 25, which are driven by the gear motor 26 and which are raised by means of the carriage assembly 4, therefore carry the sheet of glass off the sheet feeder 1, onto the right angle transfer mechanism 34 for subsequent processing by cutting machines and the like. The second limit switch 7, mounted near the end of the wooden table 3, is tripped by the glass sheet as the sheet passes over it. This second limit switch 7 holds the air cylinder 17 and the conveyor belt gear motor 26 energized after the glass sheet has passed over the first limit switch 6, thereby preventing the lowering of the conveyor belts 25 until the sheet of glass is clear of the sheet feeder 1. When the glass sheet passes over the second limit switch 7, the air cylinder 17 is de-energized and the conveyor belts 25 are deactivated and lowered to a position below the wooden receiving table 3.

While the present invention has been described with apparatus that causes the conveyor belt mechanism to be raised to drive the glass sheet from the table, it will be appreciated that the table may be lowered to achieve the same effect without departing from the scope of the invention.

Additionally, the table top could be constructed so the glass sheets are carried away on a cushion of air rather than on a conveyor belt, or the table top could be formed of a flat rubber belt instead of the wooden receiving surface. The conveyor belts may also be modified with a coating of resilient material, such as polyurethane, which would project above the table top, thus directly moving the sheet of glass from the table top to conventional conveying equipment as soon as the sheet falls into position.

It will be apparent that although the invention has been described in connection with glass sheets, it is not so limited, and is equally applicable to other sheet material, such as plasterboard or metal plate. Furthermore, the invention has been described where the glass sheets are being driven straight ahead by the movable belts, whereas the feeder may be designed to transfer and feed sheet material at any angle from the normal, if required.

We claim:

1. In a sheet handling and feeding apparatus for conveying sheet material along a predetermined path from a supply location to a sheet processing location spaced from said supply location, the improvement comprising:
    (a) a rack disposed at said supply location for holding said sheets in a generally vertical plane;
    (b) a sheet receiving table positioned in a generally horizontal plane in said predetermined path adjacent to said rack and having a plurality of narrow slots therethrough extending along said predetermined path and a planar sheet supporting surface substantially equal in area to the area of an individual sheet for receiving said sheet thereon as said sheet is pivoted from said vertical plane and allowed to fall by gravity in an arcuate path toward said receiving table; and
    (c) sheet conveying mechanism associated with said receiving table for conveying the sheet disposed thereon in a direction along said predetermined path away from said supply location and toward said processing location, said sheet conveying mechanism comprising power driven conveyor belts extending through said slots for engaging the under surface of the sheet disposed on the supporting surface of said table, said receiving table and conveyor belts being movable relative to each other between a first position in which the upper reaches of the conveyor belts are disposed below the supporting surface of said receiving table and a second position in which the upper reaches of said conveyor belts are disposed above said supporting surface for raising said sheet from said supporting surface during conveyance thereof along said predetermined path.

2. A sheet handling and feeding apparatus according to claim 1 wherein said receiving table is stationary and said conveyor belts are mounted on a movable carriage disposed below the supporting surface of said receiving table.

3. A sheet handling and feeding apparatus according to claim 2 further including:
    (a) a pneumatic piston-cylinder mechanism for moving said carriage relative to said receiving table to move the conveyor belts between said first and second positions.

4. A sheet handling and feeding apparatus according to claim 3 further comprising:
    (a) an actuating switch disposed on the supporting surface of said receiving table for initiating actuation of said pneumatic piston-cylinder mechanism upon contact with the shell falling onto said supporting surface to move said conveyor belts from said first position to said second position.

References Cited

UNITED STATES PATENTS

| | | | |
|---|---|---|---|
| 2,601,929 | 7/1952 | Brichard | 214—1 |
| 2,829,759 | 4/1958 | Parker | 198—21 |
| 3,223,252 | 12/1965 | Mikus | 214—1 |

FOREIGN PATENTS

| | | |
|---|---|---|
| 229,224 | 8/1963 | Austria. |

EVON C. BLUNK, *Primary Examiner.*

R. J. HICKEY, *Assistant Examiner.*